United States Patent [19]
Hunter

[11] Patent Number: 5,359,345
[45] Date of Patent: Oct. 25, 1994

[54] SHUTTERED AND CYCLED LIGHT EMITTING DIODE DISPLAY AND METHOD OF PRODUCING THE SAME

[75] Inventor: C. Eric Hunter, Chapel Hill, N.C.

[73] Assignee: Cree Research, Inc., Durham, N.C.

[21] Appl. No.: 926,035

[22] Filed: Aug. 5, 1992

[51] Int. Cl.[5] .............................................. G09G 3/36
[52] U.S. Cl. ..................................... 345/102; 345/83; 359/48
[58] Field of Search ............. 340/784 AL, 784 G, 762, 340/782, 701, 702, 703; 359/48, 39, 49; 345/102, 82, 46, 83; 357/17

[56] References Cited

U.S. PATENT DOCUMENTS

| | | | |
|---|---|---|---|
| 3,569,614 | 4/1971 | Hanlon | 359/67 |
| 3,776,615 | 12/1973 | Tsukamoto et al. | 359/55 |
| 4,180,813 | 12/1979 | Yoneda | 340/784 |
| 4,368,963 | 1/1983 | Stolov | 359/40 |
| 4,410,887 | 10/1983 | Stolov et al. | 340/784 |
| 4,581,608 | 4/1986 | Aftergut et al. | 340/784 |
| 4,712,878 | 12/1987 | Taniguchi et al. | 350/350 S |
| 4,716,403 | 12/1987 | Morozumi | 340/784 |
| 4,744,640 | 5/1988 | Phillips | 350/388 |
| 4,799,050 | 1/1989 | Prince et al. | 340/784 |
| 4,870,484 | 9/1989 | Sonehara | 340/784 |
| 4,907,862 | 3/1990 | Santola | 359/48 |
| 4,917,465 | 4/1990 | Conner et al. | 350/335 |
| 4,924,215 | 5/1990 | Nelson | 340/784 |
| 4,929,061 | 5/1990 | Tominaga et al. | 350/338 |
| 4,978,952 | 12/1990 | Irwin | 340/716 |
| 5,027,168 | 6/1991 | Edmond | 357/17 |
| 5,063,421 | 11/1991 | Suzuki et al. | 357/17 |
| 5,093,652 | 3/1992 | Bull et al. | 340/784 |
| 5,103,328 | 4/1992 | Numao | 359/48 |
| 5,243,204 | 9/1993 | Suzuki et al. | |

OTHER PUBLICATIONS

*Flat panel displays challenge the CRT;* Robert Miller, Uticor Technology, Inc.; I&CS May, 1989 pp. 39–41.

Technology Newsletter; Electronic Design; Jan. 11, 1990.
*Displays Getting Bigger, Brighter, More Colorful;* Milt Leonard; Electronic Design; May 11, 1989; pp. 57–60.
IEE The Display Makers; Industrial Electronic Engineers; California.
*Expanding Displays Seize New Functions;* David Maliniak; Electronic Design; May 24, 1990; pp. 29–31.
*Design engineers take second look at flat panel displays;* Ed Motokane; I&CS Apr., 1988; pp. 69–72.
*The Picture Brightens in Flat-Panel Technology;* Tom Manuel; Electronics/May 28, 1987; pp. 55–64.
*Perfecting the picture;* Charles M. Apt Arthur D. Little Inc.; IEEE Spectrum Jul., 1985; pp. 60–66.

Primary Examiner—Alvin E. Oberley
Assistant Examiner—Regina Liang
Attorney, Agent, or Firm—Bell, Seltzer, Park & Gibson

[57] ABSTRACT

A high resolution, full color display is provided having a liquid crystal pixel selectably addressable during a predetermined time period, a set of at least one red, one green and one blue color light source adjacent the liquid crystal pixel for emitting light through the liquid crystal pixel, and means for addressing the liquid crystal pixel a plurality of times during the predetermined time period for each color so as to provide persistence when changes in color are perceived by the human eye. A method of producing a high resolution, full color display is also provided by lighting a set of one red, one green, and one blue light sources by lighting the respective colored light sources for a predetermined time period for each color and shuttering the set of light sources with a liquid crystal pixel for at least a portion of the predetermined time period to thereby emit light from the shuttered pixel for a selected time period so as to provide persistence when changes in color are perceived by the human eye.

9 Claims, 3 Drawing Sheets

SHUTTERED AND CYCLED LIGHT EMITTING DIODE DISPLAY AND METHOD OF PRODUCING THE SAME

FIELD OF THE INVENTION

This invention generally relates to display devices and more particularly to an array of light emitting diodes in combination with a liquid crystal display for producing a high resolution, full color, flat panel display.

Background of the Invention

For many years, the cathode ray tube ("CRT") dominated the display market for numerous applications. CRTs provided high resolution, graphics, full color, and real-time animation. CRT displays, however, have several associated problems such as bulkiness, high voltage requirements, high heat generation, and sensitivity to vibration and shock.

Because of the problems associated with CRT displays, other display technologies such as the light emitting diode ("LED"), liquid crystal display ("LCD"), vacuum fluorescent ("VF"), plasma, and electroluminescence have been replacing CRT displays for many applications, especially for flat panel display applications. These technologies have various advantages in specific applications, depending on such factors as environmental conditions, voltage requirements, and size.

LED displays have been used for many years and have been popular because of their ruggedness, fast switching speeds, and wide range of sizes. These advantages, however, were somewhat diminished by the fact that blue LEDs were difficult to develop and were expensive. Without the blue LED, a full color LED display was impossible.

The lack of a blue LED slowed the development and marketability of LED display technology, especially for multi-color applications such as personal computers, computer aided design ("CAD"), and video imaging. The need for a blue LED encouraged the development of the inventions described in U.S. Pat. Nos. 4,918,497 and 5,027,168 by Edmond entitled "*Blue Light Emitting Diode Formed In Silicon Carbide.*" The silicon carbide blue LED technology, in turn, has opened the field for the development of multi-color LED displays.

LCDs have been popular for many applications, primarily in low power areas such as battery-powered systems (e.g., wrist watches, portable computers) or small size applications. LCDs, however, have suffered from several problems over the years. LCDs, for example, are difficult to view in low ambient light environments because they transmit rather than emit light. In addition, LCDs have a limited viewing angle, and poor contrast.

For full color displays, supertwist LCD technology has been developed to allow a wide variety of colors and improved contrast. Supertwist technology, for example, bends light 270 degrees instead of the 90 degrees provided by conventional LCD technology. The supertwist color LCDs still lack the clarity and brightness achieved by CRT displays and LED displays.

More recently, due to the problems with LED and LCD technology, LCDs have been used in combination with LEDs to attempt to achieve better clarity and brightness for flat panel displays over the full-color spectrum, especially for three-dimensional, multi-color, high resolution applications. To overcome the need for a blue LED, various filters and other devices have been used to produce the blue color when needed. Most of these alternative blue color techniques, however, added additional circuitry and expense and, therefore, were still not adequate for commercial applications.

One such method for producing a full color, flat panel display is to form a display with three colored filters (e.g., red, green, blue) for each LCD pixel. A mixture of the filtered light shines through the LCD pixel to display the desired color for that particular pixel. An example of this filter method is seen in U.S. Pat. No. 4,716,403 to Morozumi entitled "*Liquid Crystal Display Device*". Although this is a theoretically simple solution, the filter system fails to allow the intensity of individual colors of light for an individual pixel to be controlled.

Another method is to use fewer LED sources, and to project or scan the light sources over a large number of LCD pixels. As the light source is directed to a particular pixel, it lights the pixel with the appropriate color. As long as the entire display is covered in one-sixtieth (1/60th) of a second or less-a rate above which the human eye generally cannot detect the individual changes taking place-an appropriate image can be maintained. An example of such a device may be seen in U.S. Pat. No. 4,978,952 to Irwin entitled "*Flat Screen Color Video Display.*"

In the scanning method, as shown in U.S. Pat. No. 4,978,952 to Irwin, LEDs are used as individual light sources, and LCDs are used as shutters that define each pixel. The LCD pixels are opened and closed a row or column at a time in an appropriate manner to allow the LED light source to emit through the pixels, and thereby define the overall display. The intensity of color transmitted is varied by varying the output of the source LEDs.

One problem with the scanning method, however, is a lack of power output, which from a practical standpoint results in a lack of brightness, clarity, and overall resolution. The fundamental difficulty is that a row or column of LCD pixels at a time is illuminated from its source. Even if that time period for illuminating an entire row or column of LCDs is very short and refreshed very rapidly, the brightness is greatly effected. Therefore, the overall power output of the display is roughly limited by the ratio of sources to pixels in that row.

Other similar attempts at addressing this problem have been made by transferring the color to the screen a lattice or group of pixels at a time. An example of this may be seen in U.S. Pat. No. 5,093,652 to Bull et al. entitled "*Display Device.*" Because this device also controls blocks of pixels at a time, instead of individual pixels, it fails to produce the desired high resolution needed for video imaging applications. Also, the original patent application for this device was filed in a foreign country on Dec. 4, 1987, prior to the development of a commercially viable blue LED.

Thus, no high resolution, full color video, flat panel display presently exists that uses a reasonable amount of power and still provides the high intensity, full color, and high resolution required for video imaging applications.

OBJECT AND SUMMARY OF THE INVENTION

Therefore, it is an object of the present invention to provide a high resolution, full color, flat panel display by sequentially and cyclically lighting LEDs and shuttering individual pixels of an LCD as the light from the LEDs is emitted therethrough so that changes in color emitted from LEDs through the LCD are not perceived by the human eye.

It is also an object of the present invention to provide a high resolution, full color, flat panel display that selectably addresses individual liquid crystal pixels at a rate fast enough so as to allow color wrapping and persistence to occur when viewing the display.

The present invention particularly meets these objects by a display having a liquid crystal pixel of an LCD selectably addressable during a predetermined time period and used to shutter an adjacent set of light sources having at least one red, one green, and one blue light source so as to provide persistence when changes in color are perceived by the human eye. The invention also includes a method of producing a high resolution, full color display. The method has the steps of lighting a set of one red, one green, and one blue light sources by lighting each respective colored light source in the set for a predetermined time period and shuttering the set of light sources with a liquid crystal pixel for at least a portion of the predetermined time period to thereby emit light from the shuttered pixel for a selected time period from each of the red, green and blue light sources so as to provide persistence when changes in color are perceived by the human eye.

DETAILED DESCRIPTION OF A PREFERRED EMBODIMENT

The present invention now will be described more fully hereinafter with reference to the accompanying drawings in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
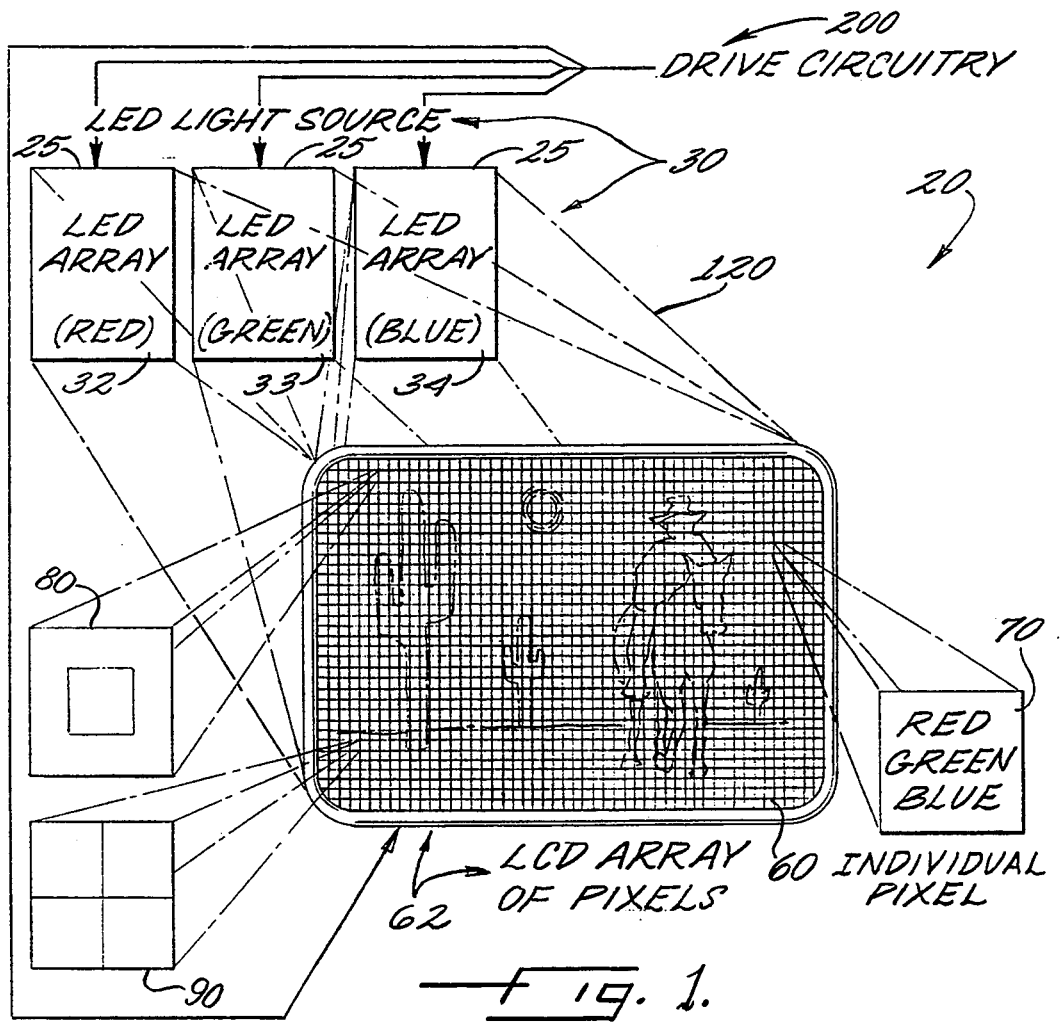
FIG. 1 is a perspective view of the LED array in combination with the LCD according to the present invention.
Figure 2:
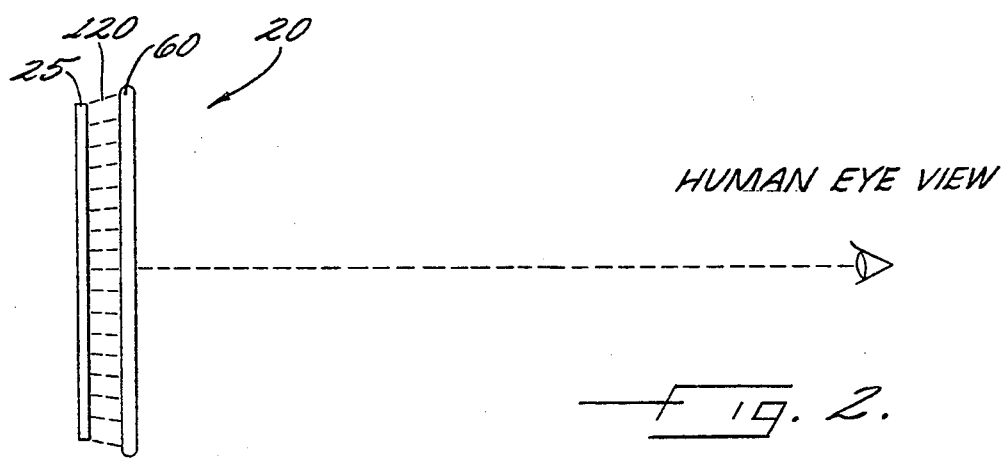
FIG. 2 is a side view of the high resolution, full color, flat panel display according to the present invention.

Referring now to FIGS. 1 and 2, shown are perspective and side views of the display 20 according to the present invention. The display 20 has an array 25 of light emitting diodes ("LED") as a light source 30. The LED array 25 has a set of at least one red 32, one green 33 and one blue 34 LED, but preferably rows and corresponding columns of interspersed colors of LEDs would be used. FIG. 1 illustrates the arrangement of the LEDs in a particular array pattern, but other patterns well known to those skilled in the art, including interspersing the colors of the LEDs, are also applicable to this invention.

The array 25 of LEDs may also be intertwined so as not to have three clearly divided color arrangements of the LEDs. The light source 30, however, may also be lasers, vacuum tube light emitters, plasma, electroluminescence, or incandescent or fluorescent lamps and the like, well known to those skilled in the art, which may be sequentially and cyclically driven at high speeds. The light source 30 may also be a mix of various types of light sources as described by example above. Filters may be used, if needed, with these various light sources to obtain the various colors desired. In addition, a yellow LED or light source may be used instead of the blue 34 LED for some display applications where the blue color is not needed.

The blue 34 LED is formed in silicon carbide in accordance with U.S. Pat. Nos. 4,918,497 and 5,027,168 to Edmond entitled "*Blue Light Emitting Diode Formed In Silicon Carbide.*" Accordingly, these patents are hereby incorporated by reference in their entirety. The red and green LEDs are typically formed in Gallium Phosphide (GAP), Gallium Arsenide Phosphide (GaAsP), Aluminum Gallium Arsenide (AlGaAs), or other like materials for LEDs well known to those skilled in the art.

Referring again to FIGS. 1 and 2, the display 20 has an array 62 of individual pixels 70 of an LCD 60 adjacent the LED light source 30 and used to shutter the light being emitted from the LED light source 30 through the individual pixels 70, 80, and 90. The individual pixels 70 typically have one liquid crystal covering each color pixel, but each color pixel may have more than one liquid crystal per pixel as shown in the exploded view of the pixels 80, 90 in FIG. 1. The liquid crystals of each pixel are also preferably all selectably addressable by appropriate circuitry. The liquid crystal pixels are preferably arranged in rows and corresponding columns to form the flat panel display 20, as seen in the side view in FIG. 2. The pixels 70, 80, and 90 must be individually selectably addressable at a high enough rate whereby changes in the opening and closing of the entire pixel 70, 80, and 90 or portions thereof, are not detected by the human eye as the LED light source 30 emits light therethrough.

A diffusant screen 120, or other like device well known to those skilled in the art, formed of glass, plastic, or other like material, is located between the LED light source 30 and the LCD 60 to evenly disperse the LED light and channel the light from the array 25 of LEDs on the LCD 60 screen and thereby allow each individual liquid crystal pixel 70 to receive the full intensity of the light emitted from the red 32, green 33, or blue 34 color from the array 25 of LEDs. The diffusant screen 120 may also be a faceted plastic or other material necessary to accomplish the even dispersion of LED light. The red 32, green 33, and blue 34 LEDs may be interspersed within the array 25 and still have the light from the LEDs evenly dispersed by the diffusant screen 120. Also, for some applications, a diffusant screen may not be desired. Collimators may also replace or be used in conjunction with the diffusant screen 120 to further channel light from the array 25 of LEDs to the LCD 60 in various arrangements of the LEDs.

The display 20 is also provided with the associated drive circuitry 200 necessary for selectably addressing individual liquid crystal pixels 70 of the LCD 60 and for sequentially and cyclically driving the LEDs 32, 33, 34. It is also understood by those well skilled in the art that a set of one red 32 LED, one green 33 LED, and one blue 34 LED could be directly placed behind the individual selectably addressable liquid crystal pixel 70 to emit light therethrough.

Figure 3:
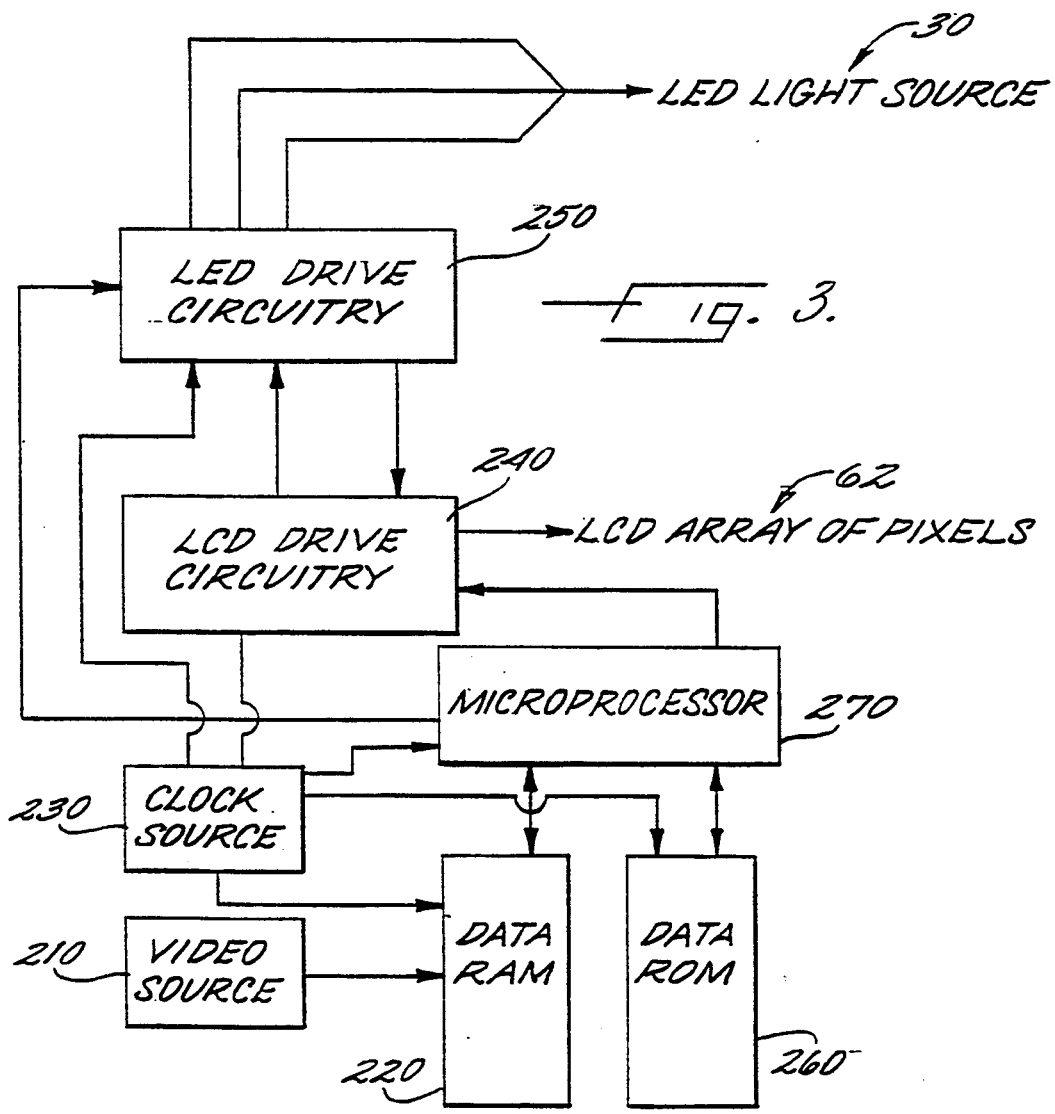
FIG. 3 is a schematic electronic circuit diagram of the display according to the present invention.

FIGS. 1 and 3 are now discussed to describe the circuitry 200 and operation of the display 20. A video signal is received and then transmitted from a video source 210 to a data random access memory ("RAM") 220. A clock signal is transmitted from a clock source 230 to the data RAM 220 to synchronize the video data transmitted to the array 25 of LEDs and the individual liquid crystal pixels 70 of the LCD 60. The individual pixels 70 of the LCD 60 are controlled and driven by the LCD drive circuitry 240 over time to allow only the appropriate amount of color through the liquid crystal pixel 70 as required to reproduce the video imaging or other data to be perceived by the human eye. The human eye cannot detect a change in color that takes place generally in less than one sixtieth (1/60th) of a second.

Figure 5:
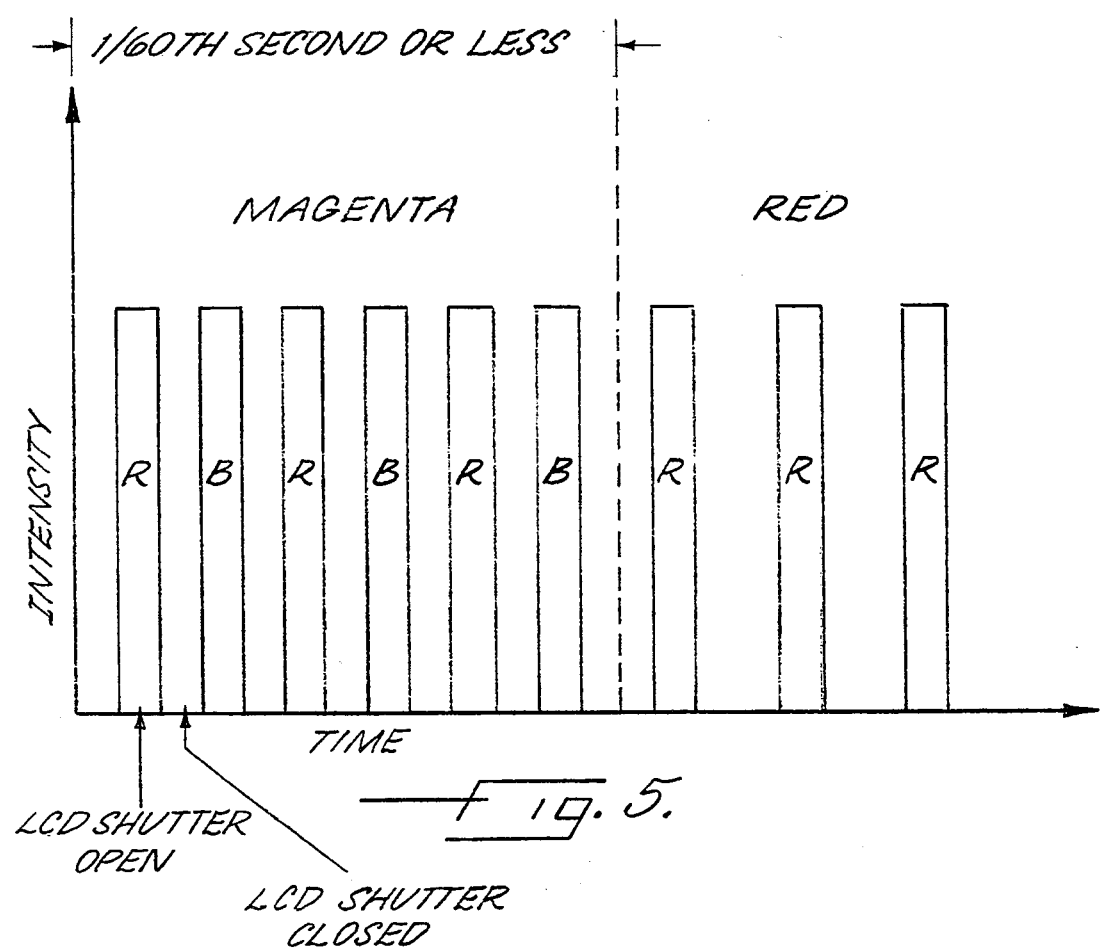
FIG. 5 graphically illustrates color wrapping pulses of the light source over time with the shuttering of a liquid crystal pixel a high number of times to define each color, thereby providing persistence.

To prevent what is commonly referred to as the "fritto effect" (named after the rapid eye movement which occurs when biting on a corn chip) wherein the human eye detects changes in color that could occur when the red 32, green 33, and blue 34 LED color pulses are blended over time, the invention allows a large number of red 32, green 33, and blue 34 color pulses to occur within the time frame that is less than the threshold perceivable by the human eye. In effect, as shown in FIG. 5, the desired color is created by "wrapping" many red 32, green 33, and blue 34 pulses together in a time frame that is less than the threshold perceivable by the human eye. For example, to create the appearance of the color magenta in a given pixel, the LCD shutter could select from (or open) of a string of 0.5 millisecond red 32, green and blue 34 light pulses, only the red 32 and blue 34 light all within a time frame less than what the human eye could detect color changes. Creating a color from very short pulses lowers the probability that the human eye would perceive the individual light pulses when rapid eye movement occurs from blinking (or biting on a "fritto," for example).

In addition, the string of color pulses may overlap in a way so that the eye does not perceive a flicker in the display. For example, a low level of green 33 can proceed each green 33 pulse and the same for red 32 and blue 34. Also, in a string of light pulses that do not overlap, the LCD shutter could remain open at a minimum level during all colors, providing no time period when light is not transmitted through the pixel, but just opening much wider than the minimum level to allow the definition of a particular color other than white.

Further, more than one liquid crystal shutter can be used to define one pixel as previously discussed. For instance, with an inner portion and an outer portion of shutter 80 or a block or an array of portions of shutter 90, as shown in FIG. 1, the display can allow part of the color string through while another provides a background light for persistence. Also, with the multiple shutter approach for a single pixel, the multiple shutters can be used to provide a means for transmitting very short light pulses when the LCD switching speed is slow. In addition, advanced LCD technology that provides semiconductor films with high electron mobility such as, but not limited to, single crystalline semiconductor layers may be used to form the drive transistors so that the LCD switching speed will increase significantly. This will allow even shorter color pulses, thereby providing a screen with better control of flicker ("fritto effect") and improved persistence.

The LEDs 32, 33, 34 are driven sequentially and cyclically by the LED drive circuitry 250 to continuously emit light from the individual liquid crystal pixels 70. The LEDs 32, 33, 34 are driven, pulsed, or strobed at a rate fast enough to avoid the detection of flickering from the LEDs, and fast enough to provide color wrapping and persistence from the LCD 60. Color wrapping occurs where the red, green and blue colors and related shades of these colors are changed at a rate fast enough so as to create the appearance of different colors or shades of color when seen by the human eye. LEDs generally may be cycled at rates of thousands of times per second or faster. The individual liquid crystal pixel 70, 80, and 90 selects the color needed from individual pulses of the LEDs 32, 33, 34 as they are sequentially cycled. Therefore, many of red 32, green 33, and blue 34 LED cycles take place in a time period generally less than the time required for the human eye to detect color changes. In order to wrap colors, a large number of pulses can be emitted by the LEDs 32, 33, 34, the intensity of the pulses can vary over time, the pulse width can vary over time, and a grey scale could be used with the liquid crystal pixels 70, 80, and 90 to partially open or close the liquid crystal pixels 70, 80, and 90 over time.

Referring again to FIGS. 1 and 4, data for the colors corresponding to the required amount of red 32, green 33, and blue 34 light to be emitted from the array 25 of LEDs, as well as the amount of time to open the individual liquid crystal pixels 70, 80, and 90 to shutter and, thereby, transmit the desired color, is stored in the data read only memory ("ROM") 260 and retrieved by the microprocessor 270. The microprocessor 270, in turn, controls the flow of information for the LEDs 32, 33, 34 and the individual liquid crystal pixels 70, 80, and 90 for the LCD 60. The information retrieved from the data ROM 260 is synchronously transmitted to the individual liquid crystal pixels 70, 80, and 90 and LEDs 32, 33, 34 by the clock source 230 and data RAM 220.

The shuttering of the individual liquid crystal pixels 70, 80, and 90 and the sequentially and cyclically lighting of the array 25 of LEDs generally occurs rapidly enough so as not to allow changes of color to be perceived by the human eye. For example, since the changes are required to occur in generally less than 1/60th of a second, each of the three LEDs 32, 33, 34 may be cycled an equal amount of time, which must be generally less than 1/180th of a second for each set of LEDs. The display, however, may also vary the cycle time for each of the individual LEDs as needed so that one may be cycled for 1/200th of a second, one for 1/360th of a second, and one for 1/150th of a second, all of which total less than the 1/60th of a second. It is also considered herein that a cycle may include having one or more of the LEDs 32, 33, 34 pulsed off or having very little light emitted therefrom.

Figure 4:
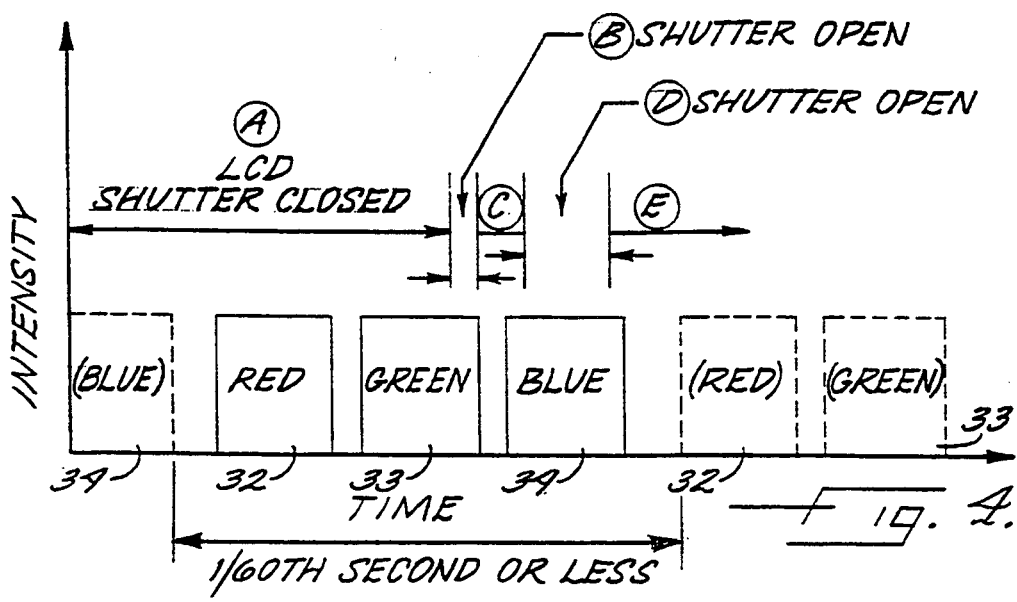
FIG. 4 graphically illustrates time versus intensity for the sequentially and cyclically lighting of the LEDs and the shuttering of the individual pixels of the LCD as perceived by the human eye according to the present invention.

FIG. 4 graphically illustrates time versus intensity for the sequentially and cyclically lighting of the LEDs 32, 33, 34 and the shuttering of the individual liquid crystal pixels 70 to have only the desired color emitted therefrom. The liquid crystal pixels 70 are shuttered to determine the amount of time that the individual pixels 70 are exposed to the continuous LED light source 30. The LEDs 32, 33, 34 can be cycled at rates of thousands of times per second or faster, and thereby allow light to be continuously emitted from the liquid crystal pixels 70 as needed.

For example, in FIG. 4, to produce a light blue color visible as such to the human eye, then the liquid crystal pixel 70 is shuttered over time to allow only this color to be emitted therefrom. FIG. 4 illustrates five time intervals, A through E. During interval A, the liquid crystal pixel 70 is shuttered closed. Interval A includes the entire red 32 LED cycle and the majority of the green 33 LED cycle. At some point during the green 33 LED cycle, however, and as indicated by interval B, the liquid crystal pixel 70 is shuttered open so that some portion of the green 33 LED light is transmitted from the pixel 70. During interval C, the pixel 70 is again shuttered closed, and then during interval D, the pixel 70 is again shuttered open for the majority of the blue 34 LED cycle. The pixel 70 is shuttered closed during interval E.

The result is that during a period of time which is less than that in which the human eye can perceive a difference, the particular pixel 70 represented by the graph has been permitted to emit green 33 LED light for a relatively short period of time and blue 34 LED light for a relatively longer period of time. Therefore, even though these colors were emitted successively from the pixel 70, rather than concurrently, the eye perceives them as being mixed to give the desired light blue color. Successive cycles of the red 32, green 33, and blue 34 LED light are shown in dotted form, and the shuttering pattern illustrated could be repeated as many times as necessary to define the display pattern desired. It is also understood by those well skilled in the art that in order to achieve a white light, as needed, the red 32, green 33, and blue 34 LEDs are driven to turn on and the liquid crystal pixel is shuttered open.

In using the invention, video or other images are constantly displayed as each pixel 70, 80, and 90 selects the amount of color from the sequentially and cyclically driven light source 30 necessary to define the required color while also providing persistence. Hence, the average power transmitted or brightness level, can be excellent and, because the light is emitted from each pixel 70, 80, and 90 individually, the contrast and resolution can also be better than previous flat panel displays.

In the drawings and specification, there have been disclosed typical preferred embodiments of the invention and, although specific terms are employed, the terms are used in a generic and descriptive sense only, and not for purposes of limitation, the scope of the invention being set forth in the following claims.

That which is claimed is:

1. A method of producing a high resolution, high intensity, full color display that is particularly useful for a flat display, comprising the steps of:
   sequentially and cyclically lighting a set of one red, one green, and one blue LEDs by lighting the respective LEDs in the set for a predetermined time period for each LED in which one cycle is defined by the sum of the predetermined time periods, and in which one cycle is a time period less than that for which the sequential lighting of the LEDs can be detected by the human eye, the blue LED being formed in silicon carbide and being selected from the group having a peak emission at a wavelength ranging between about 424–428 nanometers, about 455–460 nanometers, about 465–470 nanometers, and about 475–480 nanometers so that a high intensity blue light source is thereby provided; and
   shuttering the set of LEDs with only a portion of a liquid crystal pixel for at least a portion of the sequential predetermined time periods to thereby emit light from the shuttered portion of the liquid crystal pixel for a selected time period from each of the red, green, and blue LEDs so that the light emitted from the portion of the pixel is a sequential emission of red, green, and blue light, each for a time period less than or up to the predetermined time period so that the emission from the portion of the pixel during each cycle is defined by the amount of time a light pulse from each LED is shuttered and will normally be perceived by a human eye as a blend of the colors emitted by the respective LEDs rather than as a sequential appearance of those colors.

2. A method of producing a high resolution, high intensity full color display according to claim 1, further comprising the step of:
   selectably addressing the portion of the liquid crystal pixel a plurality of address times during each sequential predetermined time period.

3. A method of producing a high resolution, high intensity, full color display according to claim 2, further comprising the step of:
   synchronizing the addressing of the portion of the liquid crystal pixel with the sequentially and cyclically lighting of the set of red, green and blue LEDs.

4. A method of producing a high resolution, high intensity, full color display according to claim 1 wherein one cycle is less than the amount of time that the human eye can detect changes in colors.

5. A method of producing a high resolution, high intensity, full color display according to claim 1, wherein one cycle is generally less than 1/60th of a second.

6. A method of producing a high resolution, high intensity, full color display according to claim 1, wherein the predetermined time period is generally less than 1/180th of a second.

7. A method of producing a high resolution, high intensity, full color display that is particularly useful for a flat display, comprising the steps of:
   receiving the data to be represented for display during a predetermined time period;
   sequentially and cyclically lighting a set of red, green, and blue LEDs in response to the received data by lighting the respective LEDs in the set,for a predetermined time period for each color, in which one cycle is defined by the sum of the predetermined time periods, and in which one cycle is a time period less than that for which the sequential lighting of the LEDs can be detected by the human eye, the blue LED being formed of silicon carbide and being selected from the group having a peak emission at a wavelength ranging between about 424–428 nanometers, about 455–460 nanometers, about 465–470 nanometers, and about 475–480 nanometers so that a high intensity blue light source is thereby provided;
   addressing individually a portion of a liquid crystal pixel a plurality of times during each sequential predetermined time period in response to the received data;

synchronizing the addressing of the individual portion of the liquid crystal pixel with the sequentially and cyclically lighting of the set of red, green, and blue LEDs; and shuttering the set of LEDs with only the individual portion of the liquid crystal pixel for at least a portion of the sequential predetermined time periods in response to the received data to thereby emit light from the shuttered portion of the pixel for a selected time period from each of the red, green, and blue LEDs so that the light emitted from the portion of the pixel is a sequential emission of red, green, and blue light, each for a time period less than or up to the predetermined time period so that the emission from the portion of the pixel during each cycle is defined by the amount of time a light pulse from each LED is shuttered and will normally be perceived by a human eye as a blend of the colors emitted by the respective LEDs rather than as a sequential appearance of those colors.

8. A method of producing a high resolution, high intensity, full color display according to claim 7 wherein one cycle is generally less than 1/60th of a second.

9. A method of producing a high resolution, high intensity, full color display according to claim 7, wherein said predetermined time period is generally less than 1/180th of a second.

* * * * *